US008730303B2

(12) United States Patent
Suh et al.

(10) Patent No.: US 8,730,303 B2
(45) Date of Patent: May 20, 2014

(54) BROADCAST TRANSMITTER, BROADCAST RECEIVER AND 3D VIDEO DATA PROCESSING METHOD THEREOF

(75) Inventors: Jong Yeul Suh, Seoul (KR); Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 13/259,337

(22) PCT Filed: Jan. 19, 2010

(86) PCT No.: PCT/KR2010/000346
§ 371 (c)(1),
(2), (4) Date: Sep. 23, 2011

(87) PCT Pub. No.: WO2010/126221
PCT Pub. Date: Nov. 4, 2010

(65) Prior Publication Data
US 2012/0105583 A1 May 3, 2012

Related U.S. Application Data

(60) Provisional application No. 61/173,196, filed on Apr. 27, 2009, provisional application No. 61/240,657, filed on Sep. 9, 2009.

(51) Int. Cl.
*H04N 13/00* (2006.01)
(52) U.S. Cl.
USPC .......................................................... 348/43
(58) Field of Classification Search
USPC .......................................................... 348/43
See application file for complete search history.

(56) References Cited

U.S. PATENT DOCUMENTS

| 5,555,324 A | 9/1996 | Waxman et al. |
| 5,717,415 A | 2/1998 | Iue et al. |
| 7,580,178 B2 | 8/2009 | Cho et al. |
| 2006/0064716 A1* | 3/2006 | Sull et al. ................. 725/37 |

FOREIGN PATENT DOCUMENTS

| CN | 1301115 | 6/2001 |
| CN | 1954606 | 4/2007 |
| JP | 2004-193673 A | 7/2004 |
| KR | 10-2007-0058302 A | 6/2007 |
| KR | 10-2008-0039797 A | 5/2008 |
| WO | WO 2007/007923 A1 | 1/2007 |
| WO | WO 2007/067020 A1 | 6/2007 |
| WO | WO 2007067020 A1 * | 6/2007 |

* cited by examiner

*Primary Examiner* — Christopher S Kelley
*Assistant Examiner* — Matthew Kwan
(74) *Attorney, Agent, or Firm* — McKenna Long & Aldridge LLP

(57) ABSTRACT

A broadcast transmitter, a broadcast receiver, and a 3D video data processing method are disclosed. The 3D video data processing method includes formatting 3D video data (S 9010) encoding the formatted 3D video data (S 9020), generating system information having 3D format information (S 9030) that includes information about 3D video data formatting and information about the encoding, and transmitting a broadcast signal including the 3D video data and the system information (S 9040). The 3D video data processing method includes receiving a broadcast signal including 3D video data and system information, obtaining 3D image format information by parsing the system information, decoding the 3D video data, scanning the decoded 3D video data according to the 3D image format information, and formatting the scanned video data.

20 Claims, 17 Drawing Sheets

Fig. 4

| Syntax | No. of Bits | Format |
|---|---|---|
| terrestrial_virtual_channel_table_section() { | | |
|     table_id | 8 | 0xC8 |
|     section_syntax_indicator | 1 | '1' |
|     private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0; i<num_channels_in_sectino; i++) { | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved    4010 | 3 | '111' |
|         service_type | 6 | uimsbf |
|         source_id | 16 | uimsbf |
|         reserved | 6 | '1111' |
|         descriptors_length | 10 | uimsbf |
|         for(i=0; i<N; i++) { | | |
|             descriptor()    4020 | | |
|         } | | |
|     } | | |
|     reserved | 6 | '111111' |
|     additional_descriptors_length | 10 | uimsbf |
|     for(j=0; j<N; j++) { | | |
|         additional_descriptor() | | |
|     } | | |
|     CRC_32 | 32 | rpchof |
| } | | |

Fig. 5

| Syntax | No. of Bits | Format |
|---|---|---|
| stereo_format_descriptor_VCT ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j<number_elements; j++) { | | |
|         stream_type | 8 | uimsbf |
|         reserved | 3 | '111' |
|         elementary_PID | 13 | uimsbf |
|         stereo_composition_type | 8 | uimsbf |
|         reserved | 4 | '1111' |
|         LR_first_flag | 1 | bslbf |
|         LR_output_flag | 1 | bslbf |
|         Left_flipping_flag | 1 | bslbf |
|         Right_flipping_flag | 1 | bslbf |
|         Sampling_flag | 1 | bslbf |

Fig. 6

| Syntax | No. of Bits | Format |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; i<N; i++) { | | |
|         descriptor() | | |
|     } | | |
|     for(i=0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for(i=0; i<N2; i++) { | | |
|             descriptor()  —6010 | | |
|         } | | |
|     } | | |
|     CRC_32 | 32 | rpchof |
| } | | |

| Syntax | No. of Bits | Format |
|---|---|---|
| stereo_format_descriptor_PMT ( ) { | | |
|     descriptor_tag | 8 | 0xTBD |
|     descriptor_length | 8 | uimsbf |
|     stereo_composition_type | 8 | uimsbf |
|     reserved | 4 | '1111' |
|     LR_first_flag | 1 | bslbf |
|     LR_output_flag | 1 | bslbf |
|     Left_flipping_flag | 1 | bslbf |
|     Right_flipping_flag | 1 | bslbf |
|     Sampling_flag | 1 | bslbf |
| } | | |

BROADCAST TRANSMITTER, BROADCAST RECEIVER AND 3D VIDEO DATA PROCESSING METHOD THEREOF

This application is a National Stage Entry of International Application No. PCT/KR2010/000346, filed on Jan. 19, 2010, and claims the benefit of U.S. Provisional Applications 61/173,196, filed Apr. 27, 2009 and 61/240,657, filed Sep. 9, 2009, all of which are hereby incorporated by reference for all purposes as if fully set forth herein in their entireties.

TECHNICAL FIELD

The present invention relates to an apparatus and method for processing a broadcast signal, and more particularly to a broadcast transmitter, a broadcast receiver, and a 3D video data processing method thereof, which can process video data when a 3D broadcast system transmits a plurality of video streams.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcast transmitter, a broadcast receiver and a 3D video data processing method, that substantially obviate one or more problems due to limitations and disadvantages of the related art.

An object of the present invention is to provide a broadcast transmitter, a broadcast receiver, and a 3D video data processing method, which transmit and receive 3D video data when a 3D broadcast system transmits two video streams for stereoscopic display, and process the 3D video data using the broadcast transmitter and the broadcast receiver, and thus providing a user with more effective and convenient broadcast environments.

Solution to Problem

The object of the present invention can be achieved by providing a three dimensional (3D) video data processing method, the method including formatting, by a video formatter, 3D video data, encoding, by an encoder, the formatted 3D video data, generating, by a system information processor, system information having 3D image format information that includes information about 3D video data formatting and information about the encoding, and transmitting, by a transmitting unit, a broadcast signal including the 3D video data and the system information.

In another aspect of the present invention, provided herein is a three dimensional (3D) video data processing method, the method including receiving, by a receiving unit, a broadcast signal including 3D video data and system information, obtaining, by a system information processor, 3D image format information by parsing the system information, decoding, by a decoder, the 3D video data, scanning, by an output formatter, the decoded 3D video data according to the 3D image format information, and formatting and outputting the scanned video data.

Advantageous Effects of Invention

According to embodiments of the present invention, the broadcast receiver can process 3D video data such that a 3D effect intended by a 3D broadcast service provider is reflected in the 3D broadcast service.

In addition, the embodiments of the present invention can effectively provide a 3D broadcast service simultaneously while minimizing the effect on a conventional 2D broadcast service.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 4 shows a syntax structure of a Terrestrial Virtual Channel Table (TVCT) including stereo format information according to one embodiment of the present invention.

FIG. 5 shows a syntax structure of a stereo format descriptor included in a TVCT according to one embodiment of the present invention.

FIG. 6 shows a syntax structure of a Program Map Table (PMT) including stereo format information according to one embodiment of the present invention.

BEST MODE FOR CARRYING OUT THE INVENTION

Figure 1:
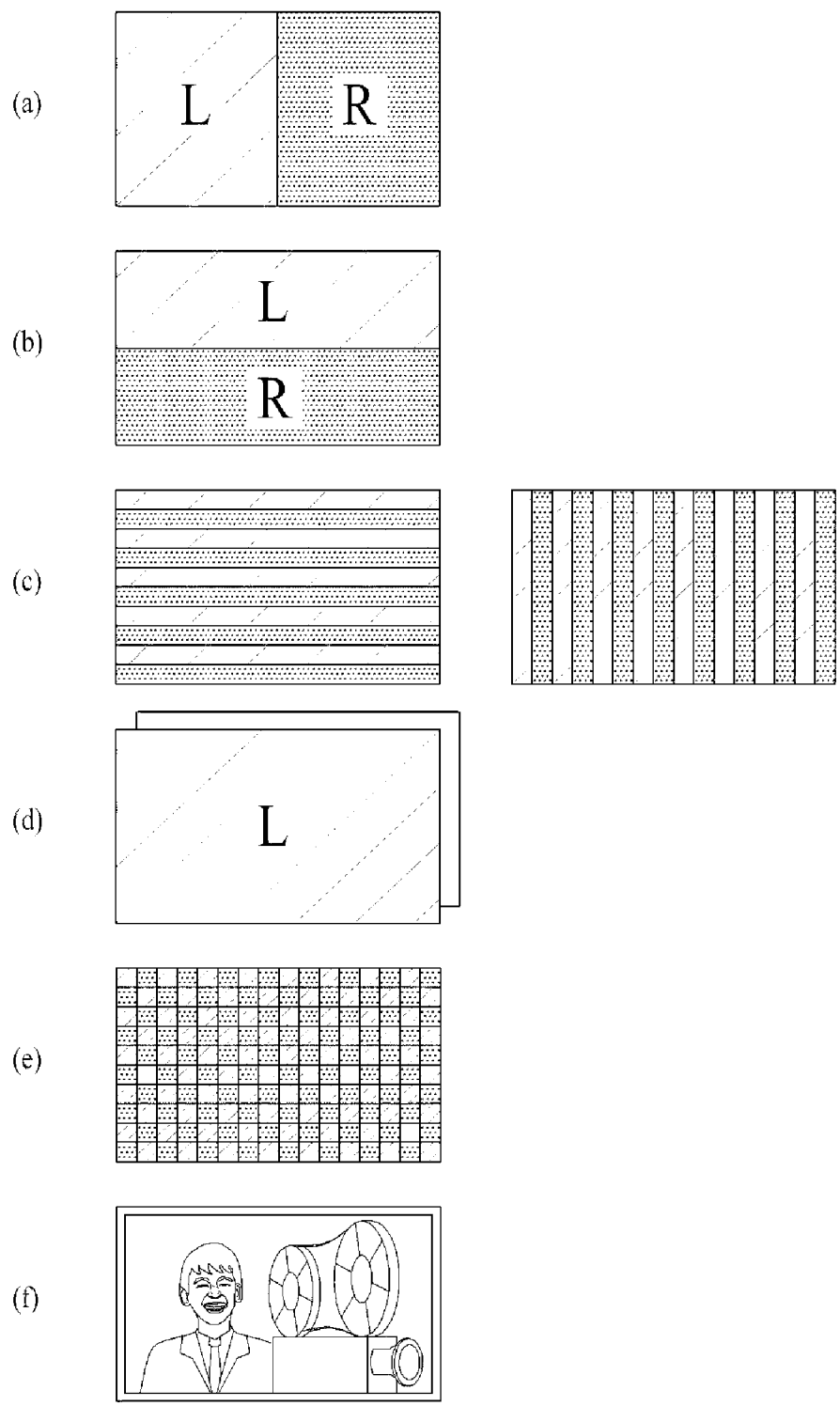
FIG. 1 is a conceptual diagram illustrating a stereoscopic image multiplexing format of a single video stream format according to the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two viewpoints are considered and a multi-view imaging scheme in which three or more viewpoints are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme. For convenience of description and better understanding of the present invention, the term 'stereoscopic' may also be referred to as 'stereo' as necessary.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

A conventional terrestrial DTV transmission/reception standard is based on 2D video content. Therefore, in order to provide 3D TV broadcast content, a transmission/reception standard for 3D video content must be additionally defined. The broadcast receiver receives a broadcast signal according to the added transmission/reception standard, and properly processes the received broadcast signal, such that it can support the 3D broadcast service.

A conventional DTV transmission/reception standard according to embodiments of the present invention will hereinafter be described using an Advanced Television Systems Committee (ATSC) standard as an example.

The ATSC system includes specific information for processing broadcast content in system information, and transmits the resultant system information including the specific information. For example, the system information may be called service information. The system information includes channel information, program information, event information and the like. The ATSC standard includes the aforementioned system information in a Program Specific Information/Program and System Information Protocol (PSI/PSIP), and can transmit and receive the resultant PSI/PSIP including the system information. However, the scope and spirit of the present invention are not limited to the above-mentioned examples. If it is assumed that there is a protocol capable of transmitting the system information in a table format, the scope and spirit of the present invention can also be applied to other examples irrespective of titles of the system information.

The PSI is disclosed only for illustrative purposes and better understanding of the present invention. The PSI may include a Program Association Table (PAT), a Program Map Table (PMT), and the like The PAT corresponds to specific information which is transmitted by a packet having a PID of '0'. The PMT transmits a program identification number, packet identifier (PID) information of a transport stream packet in which individual bit streams of video and audio data constituting a program are transmitted, and PID information in which a PCT is transmitted. In addition, in the case where the PMT acquired from the PAT is parsed, information regarding correlation among constituent elements of a program can be acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio- and/or video-data. That is, when the VCT is parsed, a channel name, a channel number, and the PID of the audio and video data of a broadcast program carried in the channel can be known. The STT transmits current date and time information, and the RRT transmits information about a region and a deliberative council for a program rating level. The ETT transmits an additional description about a channel and a broadcast program, and the EIT transmits information about an event of a virtual channel. The DCCT/DCCSCT transmits information about an automatic channel change, and the MGT transmits version- and PID-information of individual tables contained in the PSIP.

For stereoscopic display, the 3D broadcast system may multiplex a left view image and a right view image into one video stream and transmit the resultant video stream. In this case, the resultant video stream may be referred to as stereoscopic video data or stereoscopic video signal of an interim format. In order to receive a stereoscopic video signal in which left-view video data and right-view video data are multiplexed over a broadcast channel and then effectively display the received stereoscopic video signal, it is necessary for the conventional system standard such as PSIP to perform signaling of a corresponding 3D broadcast service.

In the case where each of two-view video data (i.e., each of first view video data and second view video data) is reduced to half-resolution video data from the viewpoint of spatial resolution of two-view video data, and first half-resolution video data of the first view video data and second half-resolution video data of the second view video data are collected in one video data by a transmitter, capacity of two half-resolution video data may be larger than that of one full resolution video data. Therefore, when mixing left view video data and right view video data so as to effectively compress data, the 3D broadcast system may reverse left view video data or right view video data such that it can configure two-view video data. Therefore, in order to allow the broadcast receiver to effectively process such video data, it is necessary to perform signaling of information about video data configuration when transmitting the above-mentioned video data.

Two transport formats may be used for the stereoscopic image, i.e., a single video stream format and a multiple video stream format (also called a multi-video stream format). The single video stream format scheme multiplexes two video data of two viewpoints into one video stream and transmits the multiplexed result. The single video stream format scheme transmits video data to one video stream, such that it is advantageous in that an additional bandwidth required for providing a 3D broadcast service is reduced. The multi-video stream format scheme transmits a plurality of video data to a plurality of video streams. The multi-video stream format scheme can transmit high-capacity data whereas it increases the used bandwidth, such that it is advantageous in that it can display high quality video data.

FIG. 1 is a conceptual diagram illustrating a stereoscopic image multiplexing format of a single video stream format according to the present invention;

There are a variety of single video stream formats, for example, a side-by-side format shown in FIG. 1(a), a top-bottom format shown in FIG. 1(b), an interlaced format shown in FIG. 1(c), a frame sequential format shown in FIG. 1(d), a checkerboard format shown in FIG. 1(e), an anaglyph format shown in FIG. 1(f), etc.

In accordance with the side-by-side format shown in FIG. 1(a), each of left image data (also called left view data) and right image data (also called right view data) is 1/2 down-sampled in a horizontal direction, the sampled left image data is located at the left side of a display screen, and the sampled right image data is located at the right side of the display screen, so that a single stereoscopic image is formed. In accordance with the top-bottom format shown in FIG. 1(b), each of the left image data and the right image data is 1/2 down-sampled in a vertical direction, the sampled left image data is located at an upper part of a display screen, and the sampled right image data is located at a lower part of the display screen, so that a single stereoscopic image is formed. In accordance with the interlaced format shown in FIG. 1(c), each of the left image data and the right image data is 1/2 down-sampled in a horizontal direction, and a pixel of the sampled left image data and a pixel of the sampled right image data are alternately arranged at every line so that one stereoscopic image composed of two images is formed. In addition, each of the left image data and the right image data is 1/2 down-sampled in a vertical direction, and a pixel of the sampled left image data and a pixel of the sampled right image data are alternately arranged at every line so that one stereoscopic image composed of two images is formed. In accordance with the frame sequential format shown in FIG. 1(d), left image data and right image data are alternately arranged in time within one video stream so that a stereoscopic image is formed. In accordance with the checkerboard format shown in FIG. 1(e), left image data and right image data are 1/2 sub-sampled in vertical and horizontal direction such that the left image data and the right data image are alternately arranged in vertical and horizontal directions so that two images are integrated into one image. In accordance with the anaglyph format shown in FIG. 1(f), an image is formed using a complementary color contrast so as to implement the stereoscopic effect.

In order to effectively demultiplex video data using the above-mentioned schemes and process the demultiplexed video data, it is necessary for the reception system to transmit information about the above-mentioned multiplexing formats.

In FIG. 1, when transmitting video data using the side-by-side scheme or the top-bottom scheme, two video images, each of which is 1/2 down-sampled, are transmitted, such that each of the two video images may have a resolution of 1/2. However, video data capacity when two half-resolution images are transmitted may be larger than video data capacity when one full-resolution image is transmitted. For example, when video data is coded from a reference image in such a manner that uses a difference or a relationship between the reference image and following images, a video compression rate may be increased. In this case, if an overall compression rate of two half-resolution video data is less than a compression rate of one full-resolution video data, video data capacity when two half-resolution images are transmitted may be larger than video data capacity when one full-resolution image is transmitted. In order to improve a data compression rate when a transmission system transmits data, one of the two images may be inverted in vertical direction or may be mirrored in horizontal direction.

Figure 2:
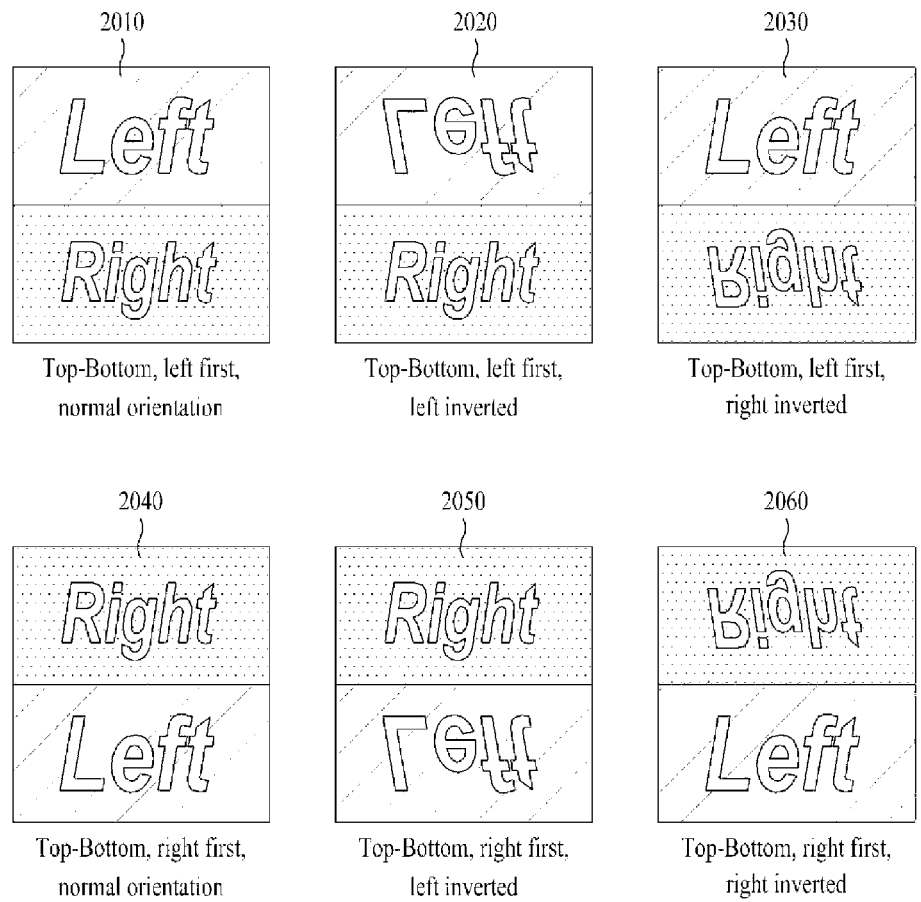
FIG. 2 shows an image forming method when a stereoscopic image is multiplexed using a top-bottom scheme according to one embodiment of the present invention.

FIG. 2 shows an image forming method when a stereoscopic image is multiplexed using a top-bottom scheme according to one embodiment of the present invention.

In case of each image 2010, 2020 or 2030, a left image is located at the top and a right image is located at the bottom. In case of each image 2040, 2050 or 2060, a left image is located at the bottom and a right image is located at the top.

In the image 2010, a left image and a right image are normally oriented (normal orientation). In the image 2020, a left image located at the top is inverted. In the image 2030, a right image located at the bottom is inverted. In the image 2040, a right image and a left image are normally oriented. In the image 2050, a left image located at the bottom is inverted. In the image 2060, a right image located at the bottom is inverted.

Figure 3:
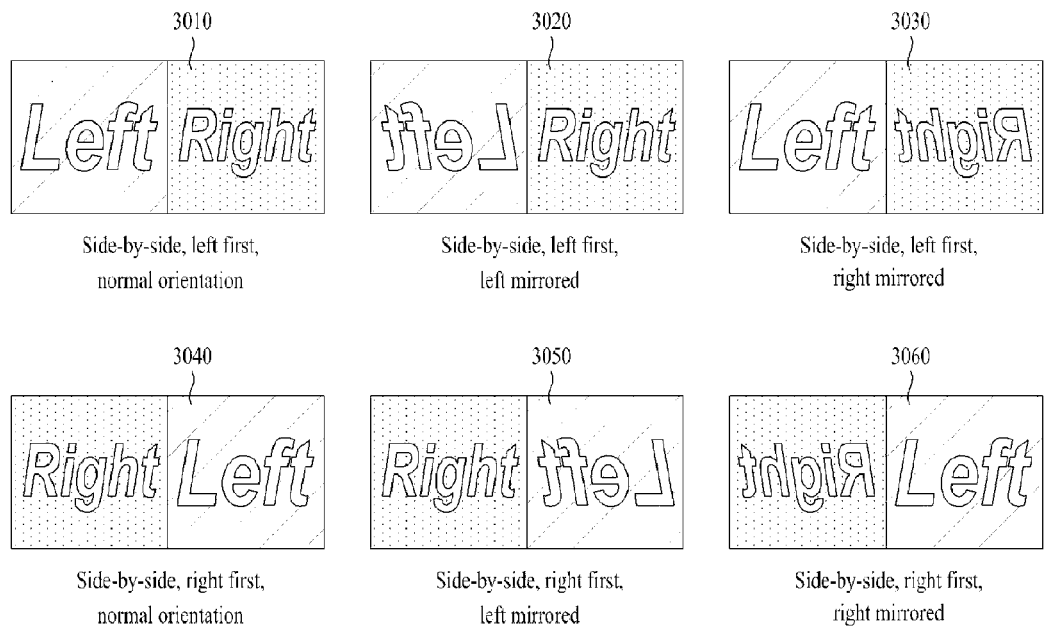
FIG. 3 shows an image forming method when a stereoscopic image is multiplexed using a side-by-side scheme according to one embodiment of the present invention.

FIG. 3 shows an image forming method when a stereoscopic image is multiplexed using a side-by-side scheme according to one embodiment of the present invention.

In case of each image 3010, 3020 or 3030, a left image is located at the left side and a right image is located at the right side. In case of each image 3040, 3050 or 3060, a left image is located at the right side and a right image is located at the left side.

In the image 3010, a left image and a right image are normally oriented (normal orientation). In the image 3020, a left image located at the left side is mirrored. In the image 3030, a right image located at the right side is mirrored. In the image 3040, a right image and a left image are normally oriented. In the image 3050, a left image located at the left side is mirrored. In the image 3060, a right image located at the left side is mirrored.

The image inverting shown in FIG. 2 and the image mirroring shown in FIG. 3 may cause a difference in data compression rate. For example, it is assumed that neighbor pixel data of a reference pixel is differentially compressed in one screen image. One pair of stereoscopic images is basically a pair of images causing the 3D effect on the same screen image, such that there is a high probability that location information of one image may be similar to that of the other image. That is, in the normal oriented images 2010, 2040, 3010 and 3040, fully new image information appears at a connection part between a left image and a right image, and differential values may be greatly changed at the connection part. However, in the case of the inverted images 2020, 2030, 2050, and 2060, the bottom of the left image is connected to the bottom of the right image as shown in the images 2030 and 2050, or the top of the left image is connected to the top of the right image as shown in the images 2020 and 2060, such that an amount of coded data may be reduced in a connection part between the left image and the right image. In the case of the mirrored images 3020, 3030, 3050 and 3060, the right side of the left image is connected to the right side of the right image as shown in the images 3030 and 3050, or the left side of the left image is connected to the left side of the right image as shown in the images 3020 and 3060, the similarity of data successively appears at a connection part between the left image and the right image, so that the amount of coded data may be reduced.

In order to allow the reception system to receive and effectively process the 3D video stream or the 3D video data, it is necessary to transmit information about the afore-mentioned multiplexing format to the reception system. In addition, if the image is inverted or mirrored as described above, it is necessary to transmit information about the inverting or mirroring operation to the reception system. Hereinafter, the above-mentioned information may be defined as a table or a descriptor for convenience of description.

The 3D image format information may be contained as a descriptor in a VCT of the PSIP or a PMT of the PSI. 3D image format information and a method for transmitting the same will hereinafter be described in detail.

FIG. 4 shows a syntax structure of a Terrestrial Virtual Channel Table (TVCT) including stereo format information according to one embodiment of the present invention. Detailed descriptions of individual fields contained in the TVCT shown in FIG. 4 are as follows.

A 'table_id' field is an 8-bit unsigned integer field that indicates the type of table section.

A 'section_syntax_indicator' field is a one-bit field which shall be set to '1' for the 'terrestrial_virtual_channel_table_section( )' field.

A 'private_indicator' field is a one-bit field which shall be set to '1'.

A 'section_length' field is a 12-bit field in which the first two bits shall be set to '00', and specifies the number of bytes of the section, starting immediately following the 'section_length' field, and including the CRC.

A 'transport_stream_id' field indicates the 16-bit MPEG-2 Transport Stream (TS) ID. The 'transport_stream_id' field distinguishes a Terrestrial Virtual Channel Table (TVCT) from others that may be broadcast in different PTCs.

A 'version_number' field serving as a 5-bit field indicates a version number of the Virtual Channel Table (VCT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid.

A 'section_number' field is an 8-bit field which gives the number of this section.

A 'last_section_number' field serving as an 8-bit field specifies the number of the last section (that is, the section with the highest section_number value) of the complete Terrestrial Virtual Channel Table (TVCT).

A 'protocol_version' field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 standard for unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the 'minor_channel_number' field represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id_field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional descriptors_length' field may indicate a total length (in bytes) of a VCT descriptor list.

A 'CRC_32' field is a 32-bit field which contains a CRC value that ensures a zero output of registers in the decoder defined in Annex A of ISO/IEC 138181 "MPEG-2 Systems" [8] after processing the entire Terrestrial Virtual Channel Table (TVCT) section.

The 'service_type' field 4010 may also indicate that a broadcast service provided from a corresponding channel is a 3D broadcast service. In accordance with one embodiment, if the 'service_type' field 4010 has a field value of 0x12, it can be recognized that a corresponding virtual channel provides a 3D broadcast program (including an audio stream, a video stream, and an additional video stream for displaying the 3D stereoscopic image).

The descriptor field 4020 includes stereo format information, and a detailed description thereof will hereinafter be described with reference to the annexed drawings.

FIG. 5 shows a syntax structure of a stereo format descriptor included in a TVCT according to one embodiment of the present invention.

A number_elements field indicates the number of video elements constructing a corresponding virtual channel. The broadcast receiver receives the stereo format descriptor, and can parse following fields as many times as the number of video elements constructing the corresponding virtual channel.

An elementary_PID field indicates a packet identifier (PID) of a corresponding video element. The stereo format descriptor may define the following information related to video elements each having a PID of the elementary_PID field. The broadcast receiver may acquire 3D video display information of a video element having a corresponding PID from the stereo format descriptor.

A stereo_composition_type field may indicate a multiplexing format of the stereoscopic image. The reception system parses the stereo_composition_type field, such that it can determine which format among several formats (i.e., a side-by-side format, a top-bottom format, an interlaced format, a frame sequential format, a checkerboard format, and an anaglyph format) was used for transmission of the corresponding 3D image.

A LR_first_flag field may indicate whether the top leftmost pixel is a left image or a right image when multiplexing the stereoscopic image. In accordance with one embodiment of the present invention, if the left image is located at the top left side, the LR_first_flag field may be assigned the value of 0. If the right image is located at the top left side, the LR_first_flag field may be assigned the value of 1. For example, the reception system can recognize that the 3D image received through the stereo_composition_type field is received using the side-by-side multiplexing format. If the LR_first_flag field is set to the value of 0, it can be recognized that a left-half image of one frame corresponds to a left image and a right-half image corresponds to a right image.

A LR_output_flag field may indicate a recommended output view for an application that outputs only one of stereoscopic images for compatibility with the 2D broadcast receiver. In accordance with one embodiment of the present invention, when displaying the 2D image, if a field value is set to the value of 0, the left image may be displayed, and if a field value is set to the value of 1, the right image may be displayed. Although the LR_output_flag field may be disregarded by a user's setup, the LR_first_flag field may indicate a default view image used for 2D display on the condition that there is no user input signal for an output image. For example, if the LR_output_flag field has the value of 1, the reception system uses the right image as a 2D output image in so far as another user setup or another user input signal is not input to the reception system.

A left_flipping_flag field and a right_flipping_flag field indicate a left-image scanning direction and a right-image scanning direction, respectively. The transmission system can scan the left image or the right image in a reverse direction, and code the scanned left or right image in consideration of the compression efficiency.

The transmission system may transmit a stereoscopic image in the top-bottom format or the side-by-side format as previously described in FIGS. 2 and 3. In case of the top-bottom format, one image is inverted in a vertical direction. In the case of the side-by-side format, one image is mirrored in a horizontal direction. In this way, if the vertical inverting or the horizontal mirroring of the image is achieved, the reception system parses the left_flipping_flag field and the right_flipping_flag field such that it can recognize the scanning direction. In accordance with one embodiment of the present invention, if each of the left_flipping_flag field and the right_flipping_flag field is set to the value of 0, this means that pixels of the left image and pixels of the right image are arranged in original scanning directions. If each of the left_flipping_flag field and the right_flipping_flag field is set to the value of 1, this means that pixels of the left image and pixels of the right image are arranged in reverse directions of the original scanning directions.

As described above, the scanning direction of the top-bottom format is a vertically reversed direction, and the scanning direction of the side-by-side format is a horizontally reversed direction. In accordance with the implementation example of the reception system, the left_flipping_flag field and the right_flipping_flag field are disregarded in the remaining multiplexing formats other than the top-bottom format and the side-by-side format. That is, the reception system parses the stereo_composition_type field so as to determine the multiplexing format. If the multiplexing format is the top-bottom format or the side-by-side format, the reception system determines the scanning direction by parsing the left_flipping_flag field and the right_flipping_flag field. In the remaining multiplexing formats other than the top-bottom and side-by-side formats, the reception system may disregard the left_flipping_flag field and the right_flipping_flag field. In case of another system according to another embodiment of the present invention, an image may also be arranged in a reverse direction in the remaining multiplexing formats other than the top-bottom and side-by-side formats. In this case, the scanning direction can be determined using the left_flipping_flag field and the right_flipping_flag field.

A sampling_flag field may indicate whether a sampling was performed in the transmission system. In one embodiment of the present invention, the transmission system may perform 1/2 down-sampling (i.e., 1/2 decimation) of data in a horizontal or vertical direction, and may diagonally perform 1/2 down-sampling (quincunx sampling or quincunx filtering) using the quincunx filter in the same manner as the checkerboard format. For example, if the sampling_flag field has the value of 1, this means that the transmission system has performed the 1/2 down-sampling in the horizontal or vertical direction. If the sampling_flag field has the value of 0, this means that the transmission system has performed the down-sampling using the quincunx filter. If the sampling_flag field has the value of 0, the reception system can recover the image using the reverse processing of the quincunx filtering.

For example, provided that individual fields of the stereo format descriptor are set to as follows: stereo_composition_type='side-by-side', LR_first_flag='1', left_flipping_flag='1', and right_flipping_flag='0', a video stream is multiplexed in the side-by-side format, such that it can be recognized that the right image is located at the left side and the left image is mirrored. Therefore, prior to displaying video data, the reception system scans in a reverse direction and constructs an output image according to the reversely scanned result. If the sampling_flag field is set to 1 (sampling_flag=1), this means that the quincunx sampling is performed. The reception system performs quincunx reverse-sampling so as to perform an appropriate formatting operation, and constructs an output image.

If the user desires to view an image in a 2D mode or a display device does not support a 3D display, the broadcast receiver may display an image of a predetermined view prescribed in the LR_output_flag field as a default image. In this case, the display device may not display images of other views and bypass them. In this case, the broadcast receiver may scan the image in a reverse direction by referring to the left_flipping_flag field and the right_flipping_flag field.

FIG. 6 shows a syntax structure of a Program Map Table (PMT) including stereo format information according to one embodiment of the present invention. Detailed descriptions of individual fields contained in the PMT shown in FIG. 6 are as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary_PID' field.

An 'elementary_PID' field is a 13-bit field specifying a PID of the Transport Stream (TS) packets which carry the associated elementary stream or payload.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

The descriptor field 6010 includes information about video streams constituting a stereoscopic image, and a detailed description of the descriptor field 6010 is as follows.

Figures 7, 8:
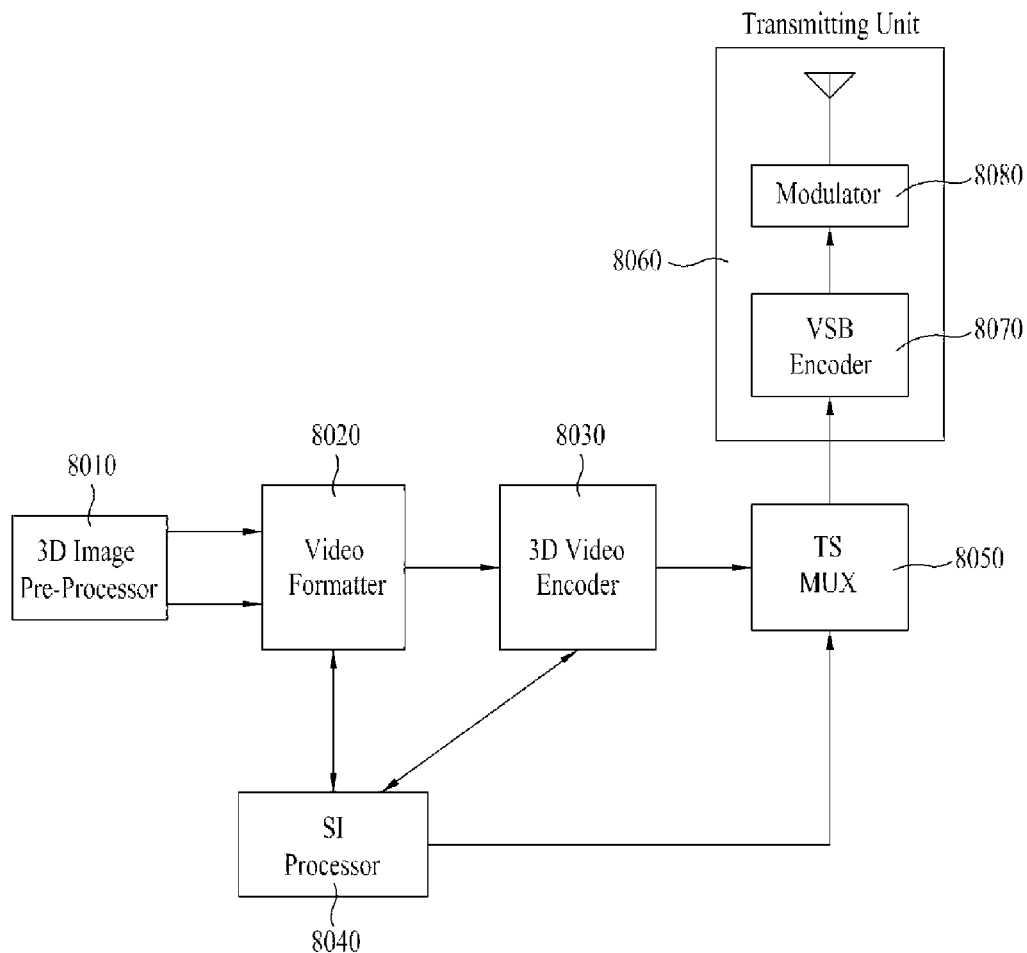
FIG. 7 shows a syntax structure of a stereo format descriptor included in a PMT according to one embodiment of the present invention.
FIG. 8 is a block diagram illustrating a broadcast transmitter according to one embodiment of the present invention.

FIG. 7 shows a syntax structure of a stereo format descriptor included in a PMT according to one embodiment of the present invention.

The stereo format descriptor shown in FIG. 7 is similar to that of FIG. 5, and as such a detailed description of same fields will herein be omitted. However, in the case of the PMT, the stream_type field and the elementary_PID field in relation to each video element are contained in the PMT differently from FIG. 5, and detailed descriptions thereof are identical to those of FIG. 5 so that they will herein be omitted.

FIG. 8 is a block diagram illustrating a broadcast transmitter according to one embodiment of the present invention.

Referring to FIG. 8, the broadcast transmitter includes a 3D image pre-processor 8010, a video formatter 8020, a 3D video encoder 8030, a System Information (SI) processor 8040, a TS multiplexer (TS MUX) 8050, and a transmitting unit 8060. The 3D image pre-processor 8010 performs image processing of a 3D image. The video formatter 8020 formats 3D video data or 3D video stream by processing 3D images. The video encoder 8030 encodes the 3D video data according to the MPEG-2 scheme or the like. The SI processor 8040 generates system information. The TS multiplexer 8050 performs multiplexing of video data and system information. The transmitting unit 8060 transmits the multiplexed broadcast signal. In accordance with the embodiment of the present invention, the transmitting unit 8060 may further include a VSB encoder 8070 and a modulator 8080. Operations of individual constituent components of the broadcast transmitter will hereinafter be described with reference to the attached drawings.

Figure 9:
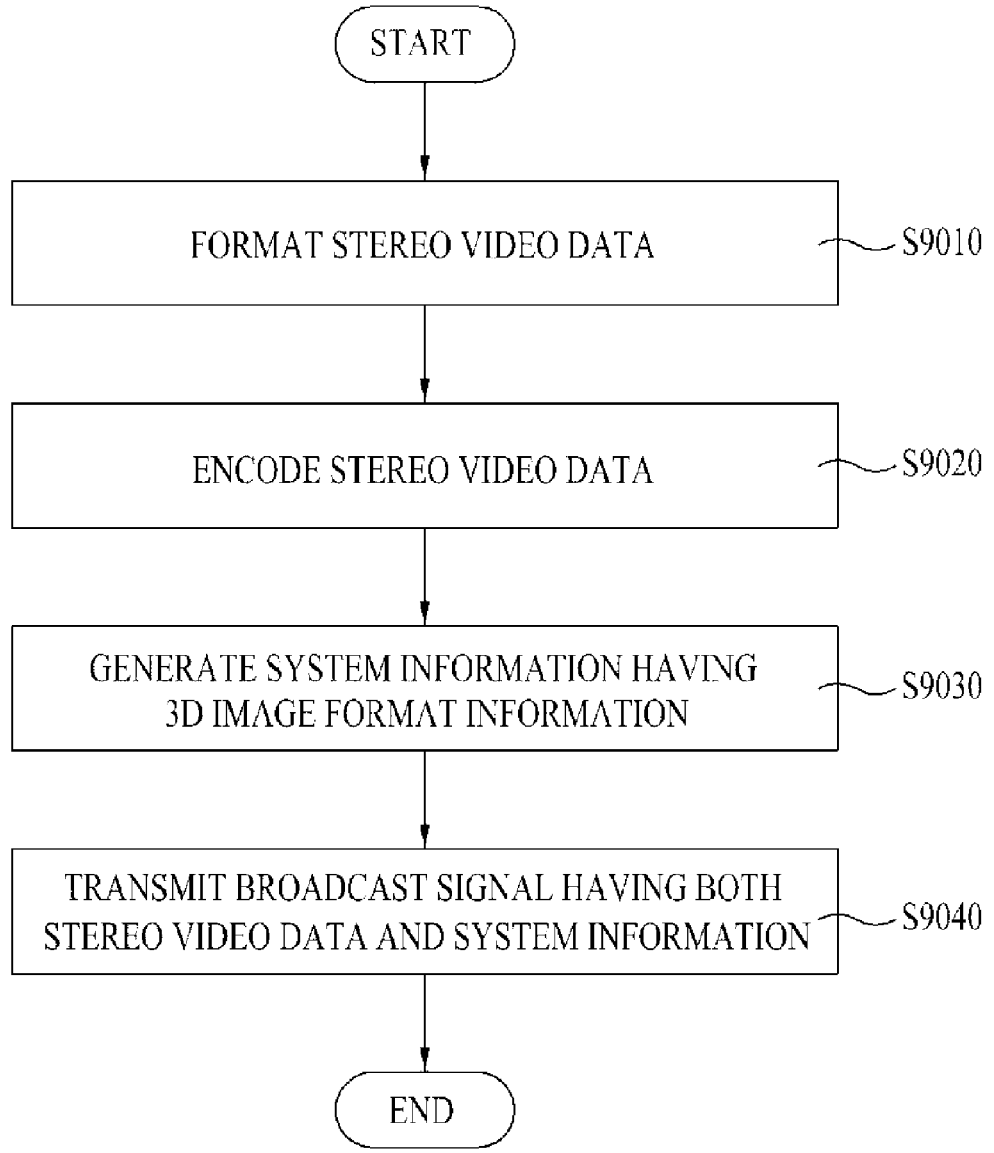
FIG. 9 is a flowchart illustrating a method for processing 3D video data of a broadcast transmitter according to one embodiment of the present invention.

FIG. 9 is a flowchart illustrating a method for processing 3D video data of a broadcast transmitter according to one embodiment of the present invention.

First, the 3D image pre-processor performs necessary processing of 3D image captured by several lenses, such that it outputs a plurality of 3D images or video data. In one embodiment of the present invention, when providing a 3D broadcast service using a stereoscopic scheme, the 3D image pre-processor outputs two-viewpoint images or two-viewpoint video data.

The broadcast transmitter formats stereo video data using the video formatter at step S9010. In one embodiment of the present invention, the broadcast transmitter performs resizing of stereo video data according to a multiplexing format, and multiplexes the resized video data, such that it outputs one video stream. Video formatting of the stereo video data may include a variety of image processing functions (e.g., resizing, decimation, interpolation, multiplexing, etc.) required for transmitting a 3D broadcast signal.

The broadcast transmitter may encode stereo video data using a 3D video encoder at step S9020. The broadcast transmitter may encode the stereo video data using any of various encoding types (i.e., a JPEG, an MPEG-2, an MPEG-4, an H.264/AVC, an H.264/AVC, etc.)

The broadcast transmitter may generate system information including 3D image format information using the SI processor. The 3D image format information is used for the transmitter to format stereo video data. The 3D image format information may include information that is required for the receiver to process and output the stereo video data. In one embodiment of the present invention, the 3D image format information may include a multiplexing format of 3D video data, locations and scan directions of a left image and a right image in response to the multiplexing format, sampling information in response to the multiplexing format, etc. For example, the 3D image format information may be contained in the PSI/PSIP from among system information. In more detail, the 3D image format information may be contained in the PMT of the PSI, and may also be contained in the VCT of the PSIP.

The broadcast transmitter multiplexes the stereo video data encoded by the 3D video encoder and the system information generated from the SI processor using the TS multiplexer, and transmits the multiplexed video data through the transmitting unit at step S9040.

Figure 10:
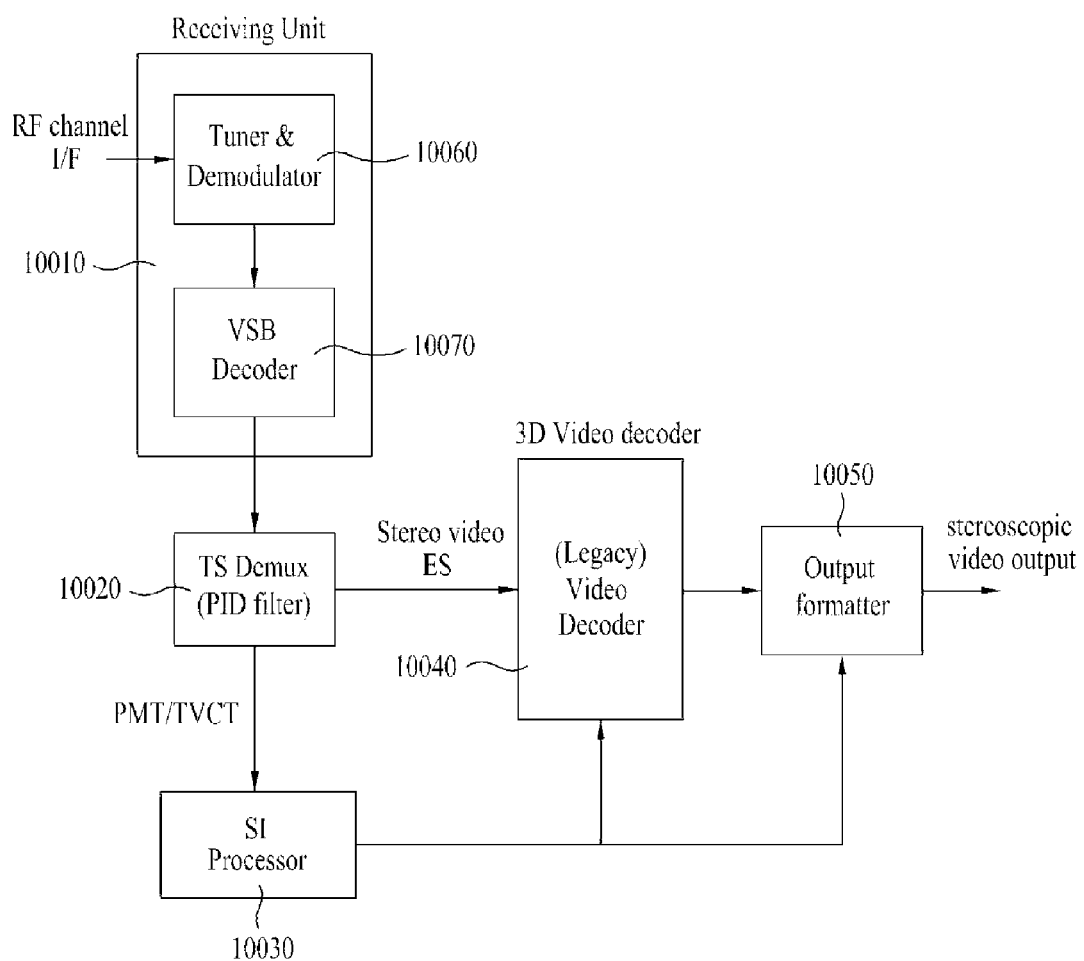
FIG. 10 is a block diagram illustrating a broadcast receiver according to one embodiment of the present invention.

FIG. 10 is a block diagram illustrating a broadcast receiver according to one embodiment of the present invention.

Referring to FIG. 10, the broadcast receiver includes a receiving unit 10010, a TS multiplexer (TS Demux) 10020, an SI processor 10030, a 3D video decoder 10040, and an output formatter 10050. The receiving unit 10010 receives a broadcast signal. The TS multiplexer 10020 extracts video data from the broadcast signal, extracts a data stream including such as system information or the like, and outputs the extracted video data and data stream. The SI processor 10030 parses the system information. The 3D video decoder 10040 decodes 3D video data. The output formatter 10050 formats the decoded 3D video data and outputs the formatted 3D video data. In accordance with one embodiment of the present invention, the receiving unit 10010 may further include a tuner & demodulator 10060 and a VSB decoder 10070. Operations of individual constituent elements of the broadcast receiver will hereinafter be described with reference to the attached drawings.

Figure 11:
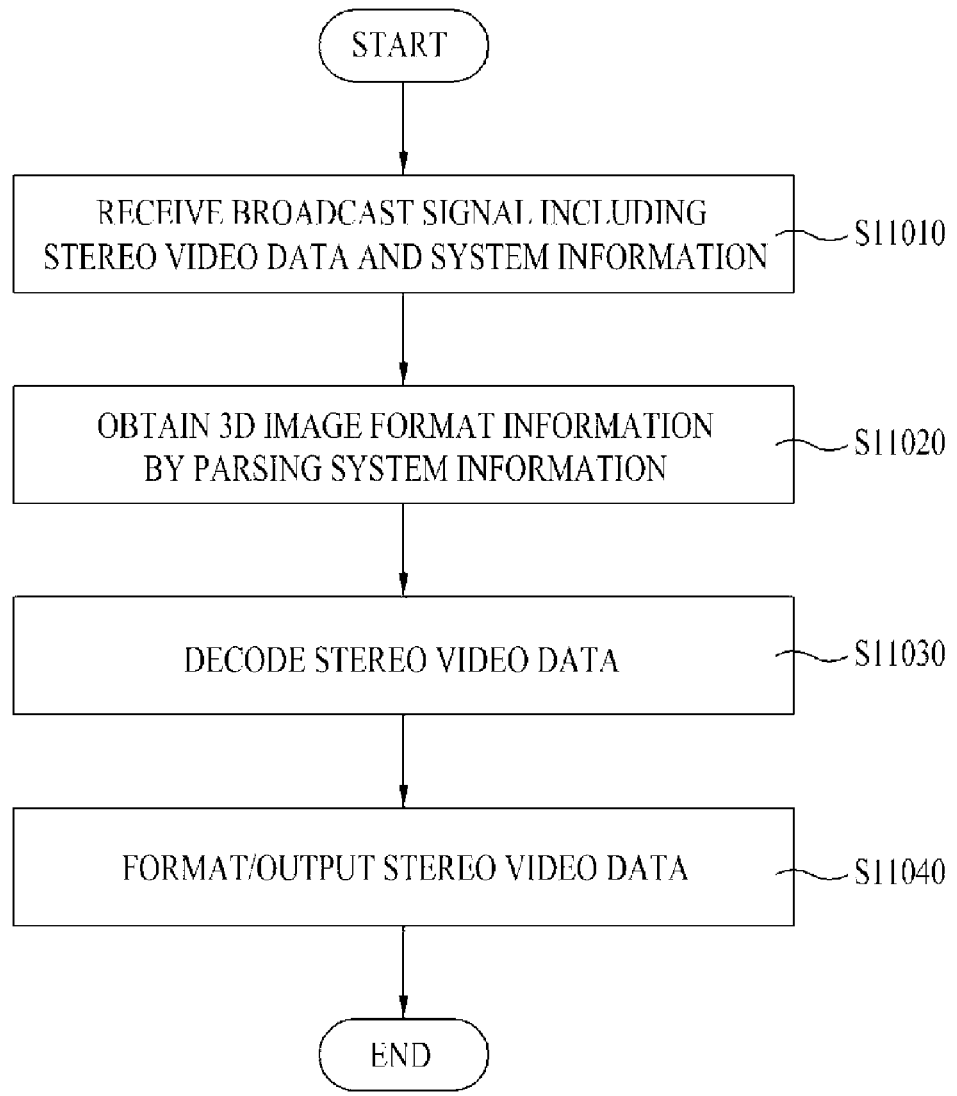
FIG. 11 is a flowchart illustrating a method for processing 3D video data of a broadcast receiver according to one embodiment of the present invention.

FIG. 11 is a flowchart illustrating a method for processing 3D video data of a broadcast receiver according to one embodiment of the present invention.

Referring to FIG. 11, the broadcast receiver receives a broadcast signal including stereo video data and system information using the receiving unit at step S11010.

The broadcast receiver parses the system information contained in the broadcast signal using the SI processor, such that it obtains 3D image format information at step S11020. In one embodiment of the present invention, the broadcast receiver parses either the PMT of the PSI of the broadcast signal or the VCT of the PSIP of the broadcast signal using the SI processor, such that it can obtain the 3D image format information. The 3D image format information includes information needed when the decoder and the output formatter of the broadcast receiver perform processing of 3D video data.

In one embodiment, the 3D image format information may include a multiplexing format of 3D video data, locations and scan directions of a left image and a right image in response to the multiplexing format, sampling information in response to the multiplexing format, etc.

The broadcast receiver decodes stereo video data using the 3D video decoder at step S11030. In this case, the broadcast receiver may decode the stereo video data using the obtained 3D image format information.

The broadcast receiver formats the decoded stereo video data using the output formatter, and outputs the formatted video data at step S11040. The formatting of the stereo video data may include an operation for processing the received stereo video data using the 3D image format information. In addition, in the case where a multiplexing format of the received stereo video data is different from the multiplexing format supported by the display device, or in the case where different video data output formats are used (2D output or 3D output), necessary image processing may be carried out by the broadcast receiver.

Next, an operation for formatting stereo video data for use in the broadcast receiver will hereinafter be described.

First, operations of the broadcast receiver either in the case of obtaining 3D image format information through the TVCT or in the case of obtaining 3D image format information through the PMT will hereinafter be described.

(1) In the Case of Receiving 3D Image Format Information Through TVCT

The broadcast receiver can determine whether or not a 3D broadcast service is provided over a corresponding virtual channel using the service_type field of the TVCT. In the case of providing the 3D broadcast service, the broadcast receiver receives elementary_PID information of the 3D stereo video data using 3D image format information (stereo format descriptor), and receives/extracts 3D video data corresponding to the PID information. By means of the 3D image format information, the broadcast receiver recognizes a variety of information about 3D video data, i.e., stereoscopic image configuration information, left/right arrangement information, left/right priority output information, left/right reverse-scanning information, resizing information, etc.

a) If a user views video data in a 2D mode, the broadcast receiver decodes 3D video data, the broadcast receiver extracts only video data corresponding to a predetermined view indicated by the LR_output_flag field, performs interpolation/resize processing of the extracted video data, etc., and outputs the processed result to the display device.

b) If a user views video data in a 3D mode, the broadcast receiver decodes 3D video data, and controls a display output using the 3D image format information. In this case, the broadcast receiver performs resizing, reshaping, 3D format conversion, etc. of video data according to the type of a display device, and therefore outputs the stereoscopic image.

(2) In the Case of Receiving 3D Image Format Information Through PMT

The broadcast receiver recognizes stream_type information of the PMT and the presence or absence of 3D image format information (stereo format descriptor) corresponding to each elementary stream. In this case, the broadcast receiver can determine whether a corresponding program provides a 3D broadcast service by recognizing the presence or absence of the 3D image format information. If the corresponding program provides the 3D broadcast service, the broadcast receiver acquires a PID corresponding to 3D video data, and receives/extracts the 3D video data corresponding to the PID.

By means of the 3D image format information, the broadcast receiver may acquire a variety of information about 3D video data, i.e., stereoscopic image configuration information, left/right arrangement information, left/right priority output information, left/right reverse-scanning information, resizing information, etc. The broadcast receiver performs mapping between the acquired information and information provided from the TVCT using the program_number field (it can recognize which one of virtual channels is used for transmission of the corresponding program).

a) If a user views video data in a 2D mode, the broadcast receiver decodes 3D video data, the broadcast receiver extracts only video data corresponding to a predetermined view indicated by the LR_output_flag field, performs interpolation/resize processing of the extracted video data, etc., and outputs the processed result to the display device.

b) If a user views video data in a 3D mode, the broadcast receiver decodes 3D video data, and controls a display output using the 3D image format information. In this case, the broadcast receiver performs resizing, reshaping, 3D format conversion, etc. of video data according to the type of a display device, and thus outputs the stereoscopic image.

(3) In the Case where a Multiplexing Format of Received 3D Video Data is Different from a Multiplexing Format Supported by a Display Device A multiplexing format of received 3D video data may be different from a multiplexing format supported by a display device.

In one embodiment, received 3D video data has the side-by-side format and the display type of the display device can support only the checkerboard format. In this case, the broadcast receiver performs decoding and sampling the 3D video stream received through the output formatter using the 3D image format information, converts the decoded result into a checkerboard output signal, and outputs the checkerboard output signal.

In another embodiment, the broadcast receiver may perform resizing and formatting so as to output video data of a spatially multiplexed format (side-by-side, top-bottom, line interlaced, or the like) according to display capacity/type information through the use of the output formatter, or may perform resizing and formatting so as to output video data of a temporally multiplexed format (frame sequential, field sequential, or the like) according to display capacity/type information through the use of the output formatter. In addition, in order to achieve coincidence between frame rates supported by the display device, the broadcast receiver may also perform frame rate conversion.

Figure 12:
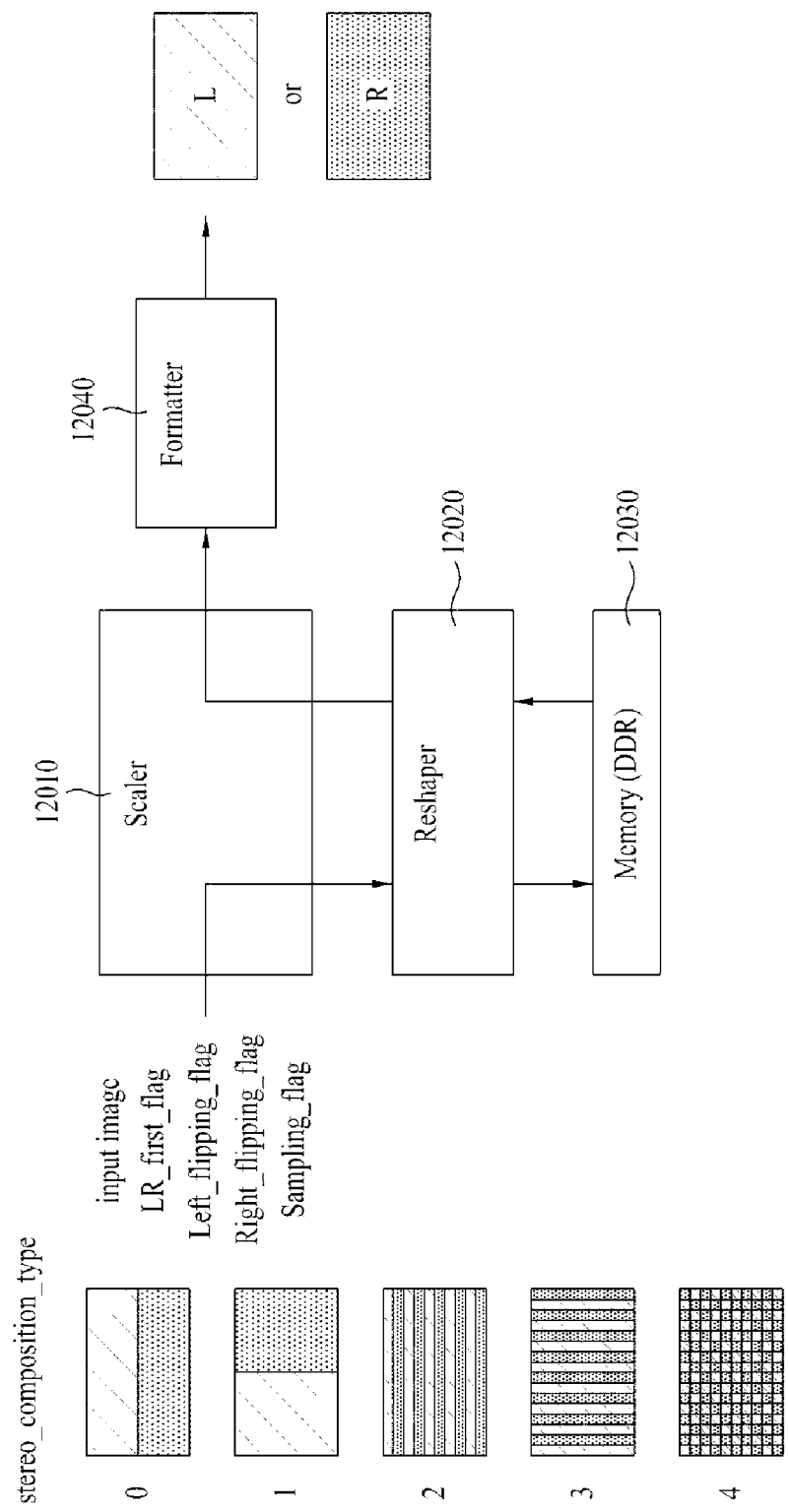
FIG. 12 is a block diagram illustrating a broadcast receiver for displaying received 3D video data in the form of a 2D image using 3D image format information according to one embodiment of the present invention.

FIG. 12 is a block diagram illustrating a broadcast receiver for displaying received 3D video data in the form of a 2D image using 3D image format information according to one embodiment of the present invention.

Referring to FIG. 12, the broadcast receiver may reconstructs 2D video image from the 3D video data wherein a left image and a right image are mixed into one frame, by using one of the left image and the right image with 3D image information.

As can be seen from the left side of FIG. 12, it is possible to recognize the multiplexing format of 3D video data according to the value of the stereo_composition_type field. In other words, the broadcast receiver parses the system information. If the stereo_composition_type field is set to the value of 0, the broadcast receiver can identify the top-bottom format. If the stereo_composition_type field is set to the value of 1, the broadcast receiver can identify the side-by-side format. If the stereo_composition_type field is set to the value of 2, the broadcast receiver can identify the horizontally interlaced format. If the stereo_composition_type field is set to the value of 3, the broadcast receiver can identify the vertically interlaced format. If the stereo_composition_type field is set to the value of 4, the broadcast receiver can identify the checkerboard format.

A conceptual diagram of the output formatter of the broadcast receiver is illustrated at the right side of FIG. 12. In one embodiment, the output formatter of the broadcast receiver may include a scaler 12010, a reshaper 12020, a memory (DDR) 12030, and a formatter 12040.

The scaler 12010 performs resizing and interpolation of the received image. For example, the scaler 12010 may perform resizing and quincunx reverse-sampling of the received image according to the received image format and the output image format. During the resizing, the received image may be resized with various rates (e.g., 1/2 resizing, doubling (2/1 resizing)) according to the resolution and the image size. The reshaper 12020 extracts the left/right images from the received image and stores the extracted left/right images in the memory 12030, or extracts the read image from the memory 12030. If a map of one image stored in the memory 12030 is different from that of an output image, the reshaper 12020 reads the image stored in the memory and maps the read image to the output image. The memory 12030 stores the received image, or buffers the received image and outputs the buffered image result. The formatter 12040 performs conversion of an image format according to the format of an image to be displayed. For example, the formatter 12040 may convert the top-bottom format image into the interlaced format.

Figure 13:
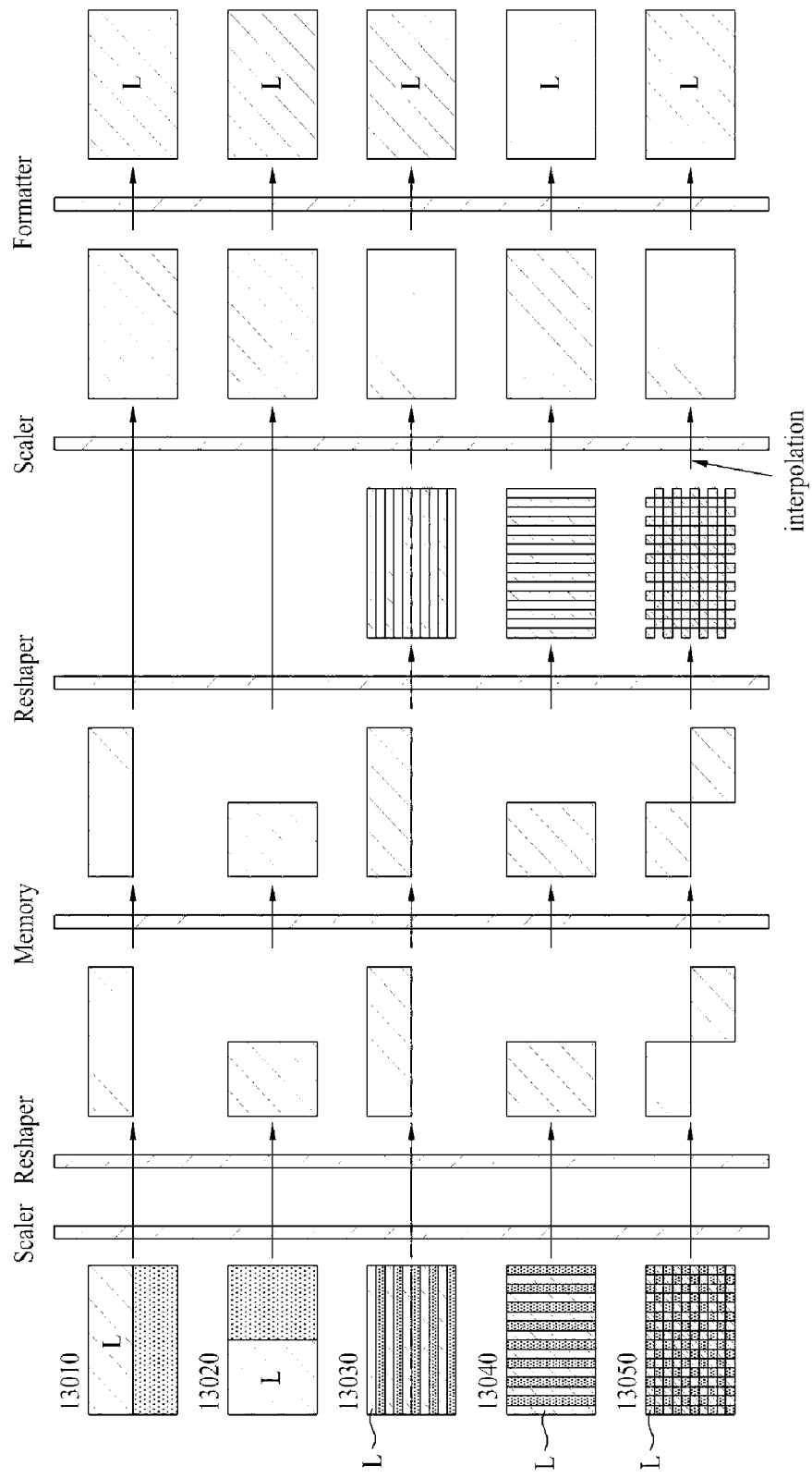
FIG. 13 is a conceptual diagram illustrating a method for displaying received 3D video data in the form of a 2D image using 3D image format information according to one embodiment of the present invention.
Figure 14:
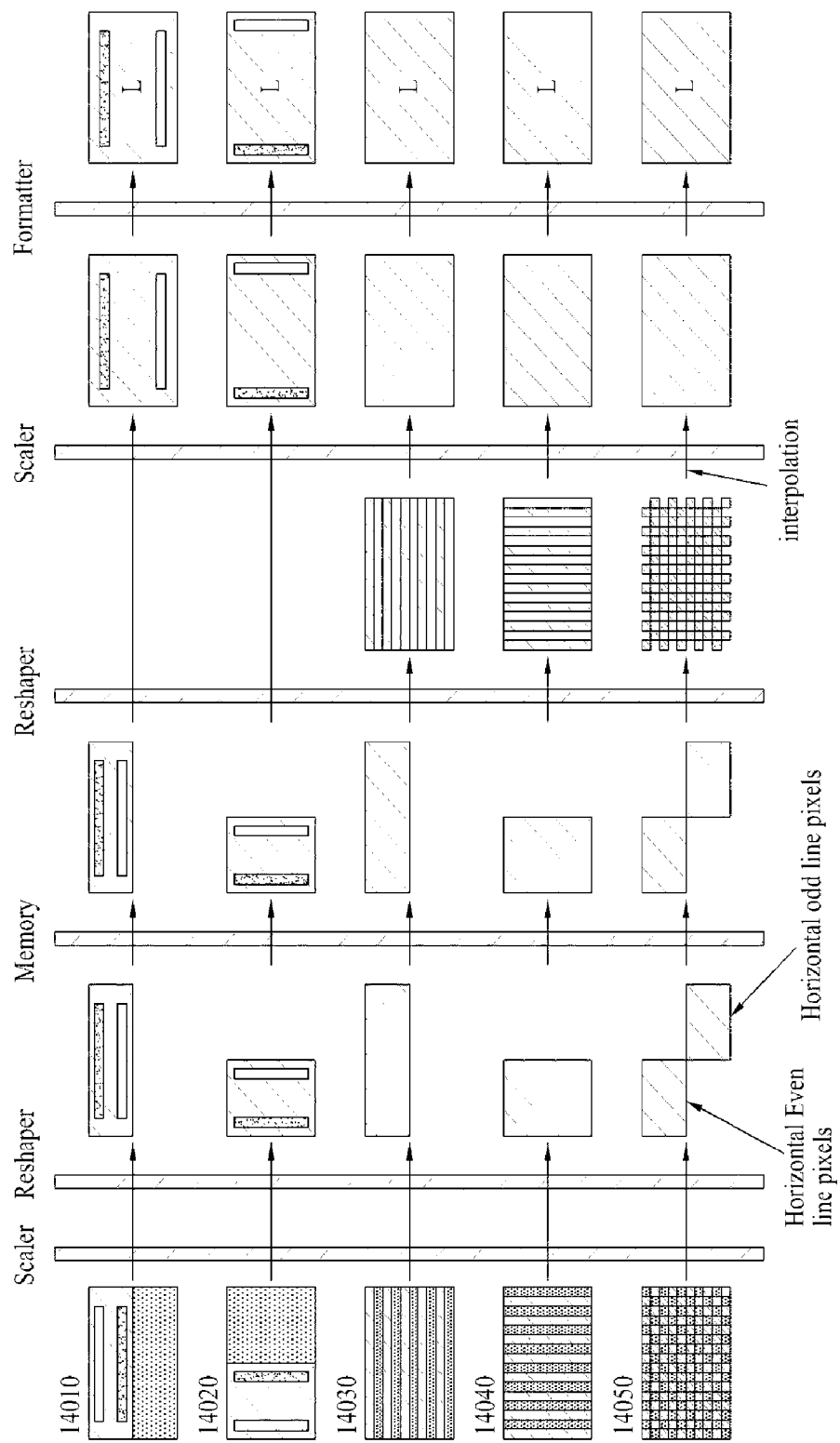
FIG. 14 is a conceptual diagram illustrating a method for displaying received 3D video data in the form of a 2D image using 3D image format information according to one embodiment of the present invention.
Figure 15:
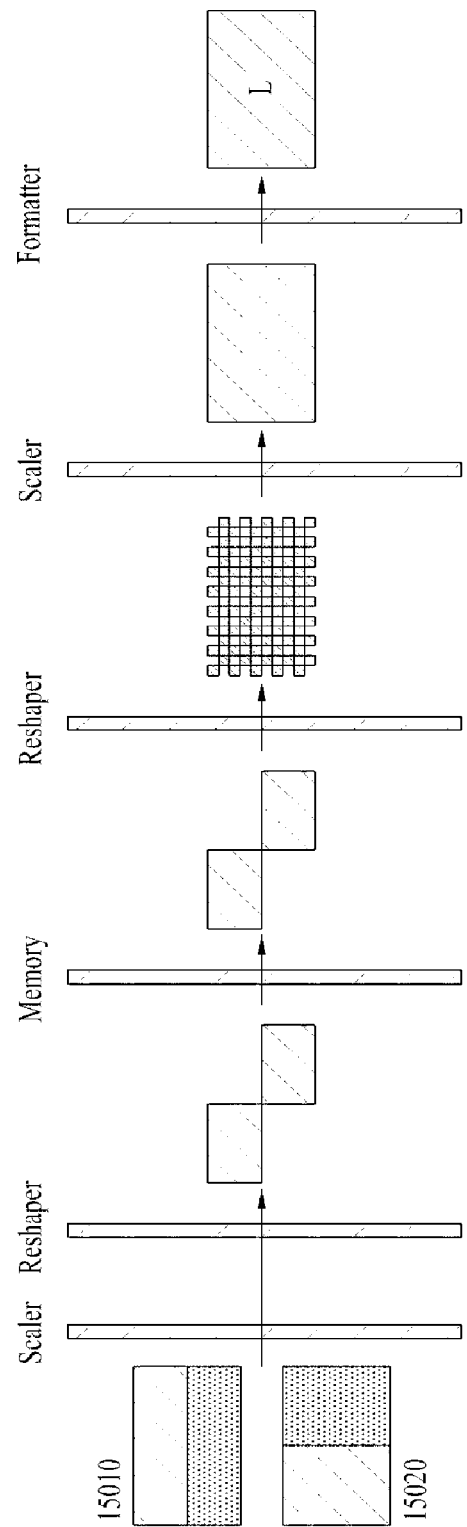
FIG. 15 is a conceptual diagram illustrating a method for displaying received 3D video data in the form of a 2D image using 3D image format information according to another embodiment of the present invention.

FIGS. 13 to 15 illustrate methods for displaying received 3D video data in the form of a 2D image according to one embodiment of the present invention.

FIG. 13 is a conceptual diagram illustrating a method for displaying received 3D video data in the form of a 2D image using 3D image format information according to one embodiment of the present invention.

FIG. 13 shows operations of the broadcast receiver when individual fields of the stereo format descriptor are set to as follows: LR_first_flag=0, LR_output_flag=0, Left_flipping_flag=0, Right_flipping_flag=0, and Sampling_flag=1. According to values given to the individual fields, if the LR_first_flag field is set to the value of 0, this means that the top left image is a left image. If the LR_output_flag field is set to the value of 0, the broadcast receiver outputs a left image when displaying a 2D image. Each of the Left_flipping_flag field and the Right_flipping_flag field is set to the value of 0. Consequently, it is not necessary to perform reverse scanning of the image. If the sampling_flag field is set to the value of 1, this means that there is no quincunx sampling, and 1/2 resizing (e.g., decimation) is carried out in a horizontal or vertical direction.

When receiving the top-bottom format image 13010 (stereo_composition_type=0), the reshaper extracts the top left image to be displayed, stores the extracted image in the memory, reads the stored image from the memory, and outputs the read image. In case of the top-bottom format image, a map of the output image is identical to that of an image stored in the memory, such that there is no need to perform additional mapping as necessary. The scaler performs interpolating or vertical 2/1 resizing of the top image, such that it outputs a full-screen left image. When displaying a 2D image, the broadcast receiver need not convert the multiplexing format of the image, such that the formatter may bypass the image received from the scaler.

When receiving the side-by-side format image 13020 (stereo_composition_type=1), the reshaper extracts the top left image to be displayed, stores the extracted image in the memory, reads the stored image from the memory, and outputs the read image. In case of the side-by-side format image, a map of the output image is identical to that of the image stored in the memory, such that there is no need to perform additional mapping as necessary. The scaler performs interpolating or horizontal 2/1 resizing of the left image, such that it outputs a full-screen left image. When displaying a 2D image, the broadcast receiver need not convert the multiplexing format of the image, such that the formatter may bypass the image received from the scaler.

Upon receiving the horizontally interlaced format image 13030 (stereo_composition_type=2), the reshaper extracts a left image to be displayed, stores the extracted left image in the memory, reads the stored image from the memory, and outputs the read image. In the case of the horizontally interlaced format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or 2/1 resizing of the interlaced format image, such that it outputs a full-screen image.

Upon receiving the vertically interlaced format image 13040 (stereo_composition_type=3), the reshaper extracts a left image to be displayed, stores the extracted left image in the memory, reads the stored image from the memory, and outputs the read image. In the case of the vertically interlaced format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or 2/1 resizing of the interlaced format image, such that it outputs a full-screen image.

Upon receiving the checkerboard format image 13050 (stereo_composition_type=4), the reshaper extracts a left image to be displayed, stores the extracted left image in the memory, reads the stored image from the memory, and outputs the read image. In the case of the checkerboard format image, although an output image is displayed in the interlaced format, the output image may be stored in the memory without arranging empty pixels among interlaced pixels so as to increase the storage efficiency. In this case, when the reshaper reads an image from the memory and outputs the read image, the reshaper performs mapping to the interlaced image, such that it outputs the mapped result to the scaler. The scaler performs interpolating or 2/1 resizing of the interlaced format image, such that it outputs a full-screen image.

FIG. 14 is a conceptual diagram illustrating a method for displaying received 3D video data in the form of a 2D image using 3D image format information according to one embodiment of the present invention.

FIG. 14 shows operations of the broadcast receiver when individual fields of the stereo format descriptor are set to as follows: LR_first_flag=0, LR_output_flag=0, Left_flipping_flag=1, Right_flipping_flag=0, and Sampling_flag=1. According to values given to the individual fields, if the LR_first_flag field is set to the value of 0, this means that the top left image is a left image. If the LR_output_flag field is set to the value of 0, the broadcast receiver outputs a left image when displaying a 2D image. The Left_flipping_flag field is set to the value of 1, such that it is necessary to perform reverse scanning of the left image. If the Right_flipping_flag field is set to the value of 0 and a 2D image is displayed, a left image will be displayed, so that a right image may be scanned or not scanned in a forward direction according to the reception system. If the sampling_flag field is set to the value of 1, this means that there is no quincunx sampling, and 1/2 resizing (e.g., decimation) is carried out in a horizontal or vertical direction.

When receiving the top-bottom format image 14010 (stereo_composition_type=0), the reshaper extracts the top left image to be displayed, stores the extracted image in the memory, reads the stored image from the memory, and outputs the read image. In this case, the Left_flipping_flag field is set to the value of 1, such that a left image is scanned in a reverse direction while the left image is read and stored. The scaler performs vertical 2/1 resizing of the top image, such that it outputs a full-screen left image. When displaying a 2D image, the broadcast receiver need not convert the multiplexing format of the image, such that the formatter may bypass the image received from the scaler.

When receiving the side-by-side format image 14020 (stereo_composition_type=1), the reshaper extracts the top left image to be displayed, stores the extracted image in the memory, reads the stored image from the memory, and outputs the read image. In this case, the Left_flipping_flag field is set to the value of 1, such that a left image is scanned in a reverse direction while the left image is read and stored. The scaler performs horizontal 2/1 resizing of the left image, such that it outputs a full-screen left image.

In FIG. 14, in the case of the horizontally interlaced format 14030, the vertically interlaced format 14040, the checkerboard format 14050, the broadcast receiver may disregard the Left_flipping_flag field and the Right_flipping_flag field and perform data processing according to system implementation examples. Consequently, video data processing is conducted in the same manner as in the horizontally interlaced format 13030, the vertically interlaced format 13040, and the checkerboard format 13050 shown in FIG. 13, and as such a detailed description thereof will herein be omitted for convenience of description. However, according to system implementation embodiments, it is determined whether to scan the image in a reverse direction using the Left_flipping_flag field and the Right_flipping_flag field, differently from the multiplexing format.

FIG. 15 is a conceptual diagram illustrating a method for displaying received 3D video data in the form of a 2D image using 3D image format information according to another embodiment of the present invention.

FIG. 15 shows operations of the broadcast receiver when individual fields of the stereo format descriptor are set to as follows: LR_first_flag=0, LR_output_flag=0, Left_flipping_flag=0, Right_flipping_flag=0, and Sampling_flag=1. According to values given to the individual fields, if the LR_first_flag field is set to the value of 0, this means that the top left image is a left image. If the LR_output_flag field is set to the value of 0, the broadcast receiver outputs a left image when displaying a 2D image. The Left_flipping_flag field is set to the value of 0, such that it is not necessary to perform reverse scanning of the left image. If the sampling_flag field is set to the value of 1, this means the presence of quincunx sampling.

The receiver receives the top-bottom format image 15010 or the side-by-side format image 15020, and the reshaper reads the left image and stores it in the memory. In this case, if the reshaper reads the image stored in the memory, the read image is not identical to the vertical 1/2 resized image or the horizontal 1/2 resized image, but is configured in the checkerboard format. Therefore, in the case where the reshaper reads the left image from the memory, it performs mapping of the quincunx-sampled checkerboard format image and outputs the mapped result. The scaler receives the checkerboard format image, and performs quincunx reverse-sampling, such that it can output a full-screen left image.

Figure 16:
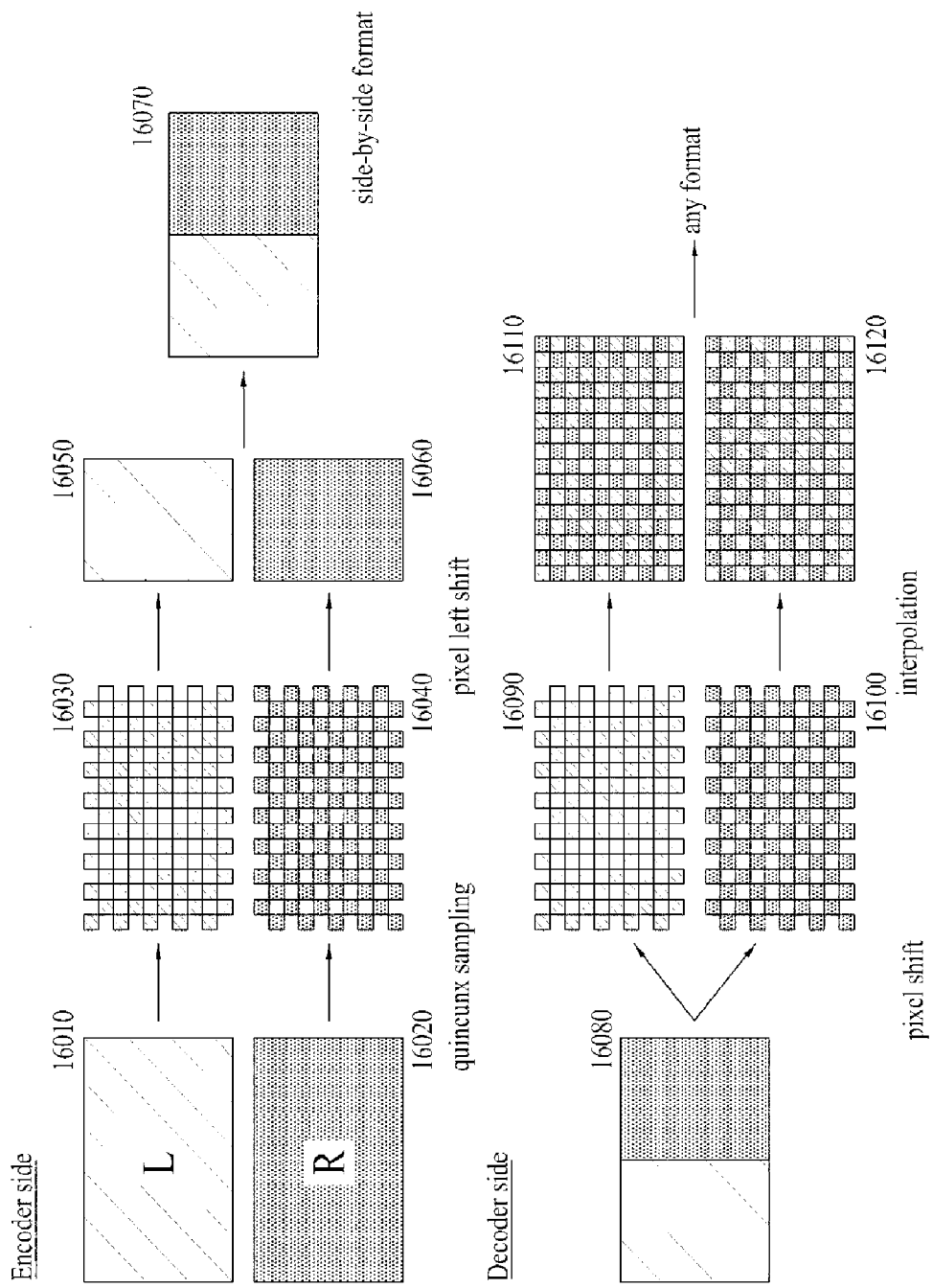
FIG. 16 is a conceptual diagram illustrating a method for processing 3D video data using a quincunx sampling according to one embodiment of the present invention.

FIG. 16 is a conceptual diagram illustrating a method for processing 3D video data using a quincunx sampling according to one embodiment of the present invention.

In FIG. 16, the upper drawing illustrates the image processing executed at an encoder side of the transmitter, and the lower drawing illustrates the other image processing executed at a decoder side of the receiver.

First, the broadcast transmitter performs quincunx sampling on the full-screen left image 16010 and the full-screen right image 16020 so as to transmit the side-by-side format image, and obtains the sampled left image 16030 and the sampled right image 16040. The broadcast transmitter performs pixel-shifting on each of the sampled left image 16030 and the sampled right image 16040, such that it acquires the 1/2-resized left image 16050 and the 1/2-resized right image 16060. The resized images 16050 and 16060 are integrated into one screen image, such that the broadcast transmitter obtains the side-by-side format image 16070 to be transmitted. An example of the side-by-side format is illustrated in FIG. 16. Although the broadcast transmitter performs horizontal pixel-shifting on the quincunx-sampled image so as to obtain the side-by-side format image, it may perform vertical pixel-shifting on the quincunx-sampled image so as to obtain the top-bottom format image as necessary.

After that, the broadcast receiver receives the top-bottom format image 16080. Since the sampling_flag field of the 3D image format information is set to the value of 0, it can be recognized that quincunx sampling has been carried out. Therefore, when the broadcast receiver scans the top-bottom format image 16080 and performs pixel sampling of the scanned image, it outputs the images 16090 and 16100, each of which is configured in the form of a quincunx sampled image. During the interpolation, the broadcast receiver performs quincunx reverse-sampling, such that it can obtain a full-screen left image 16110 and a full-screen right image.

Figure 17:
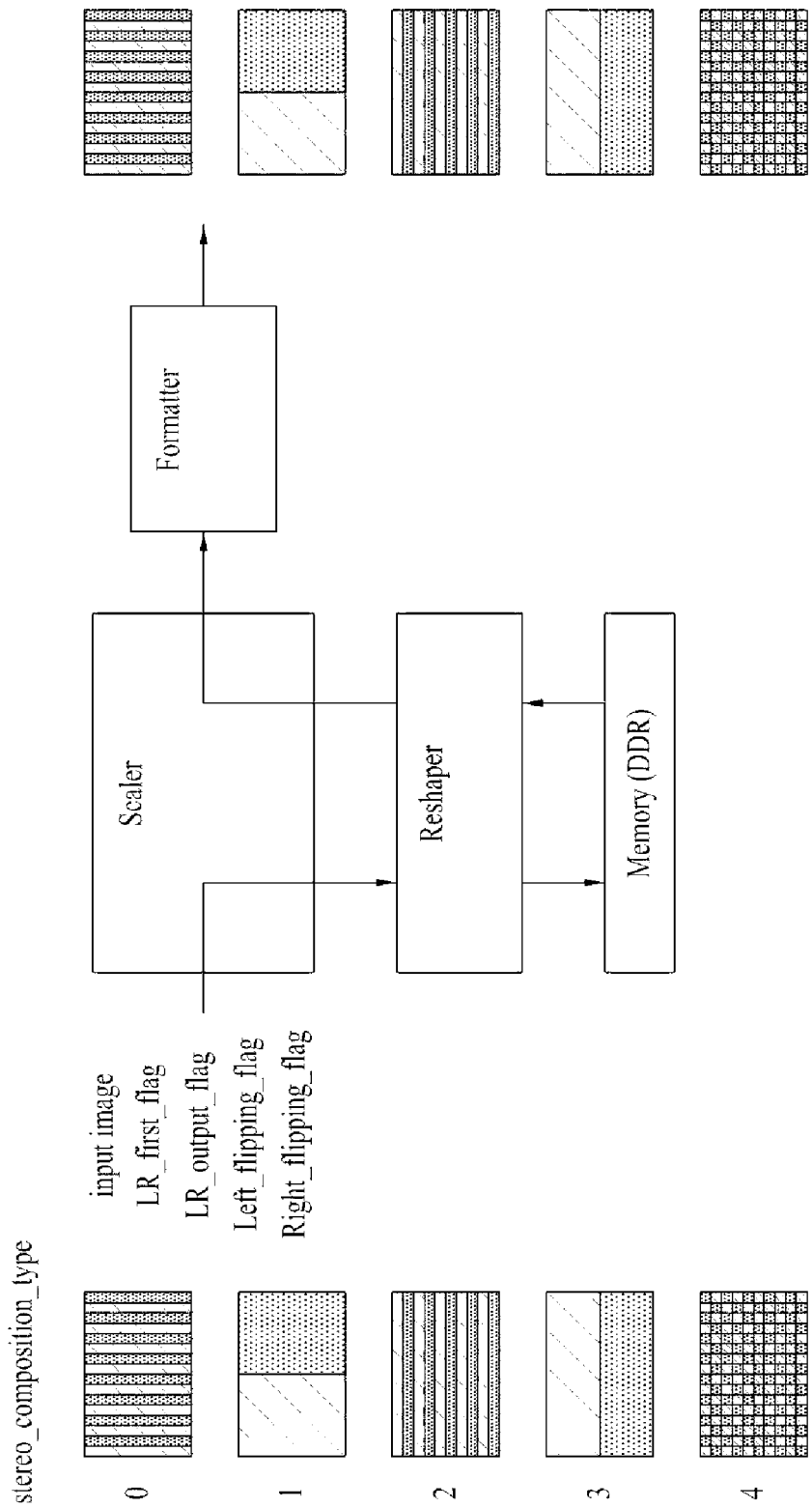
FIG. 17 is a block diagram illustrating a broadcast receiver that converts a multiplexing format of a received image using 3D image format information and then outputs the converted result according to one embodiment of the present invention.
Figure 18:
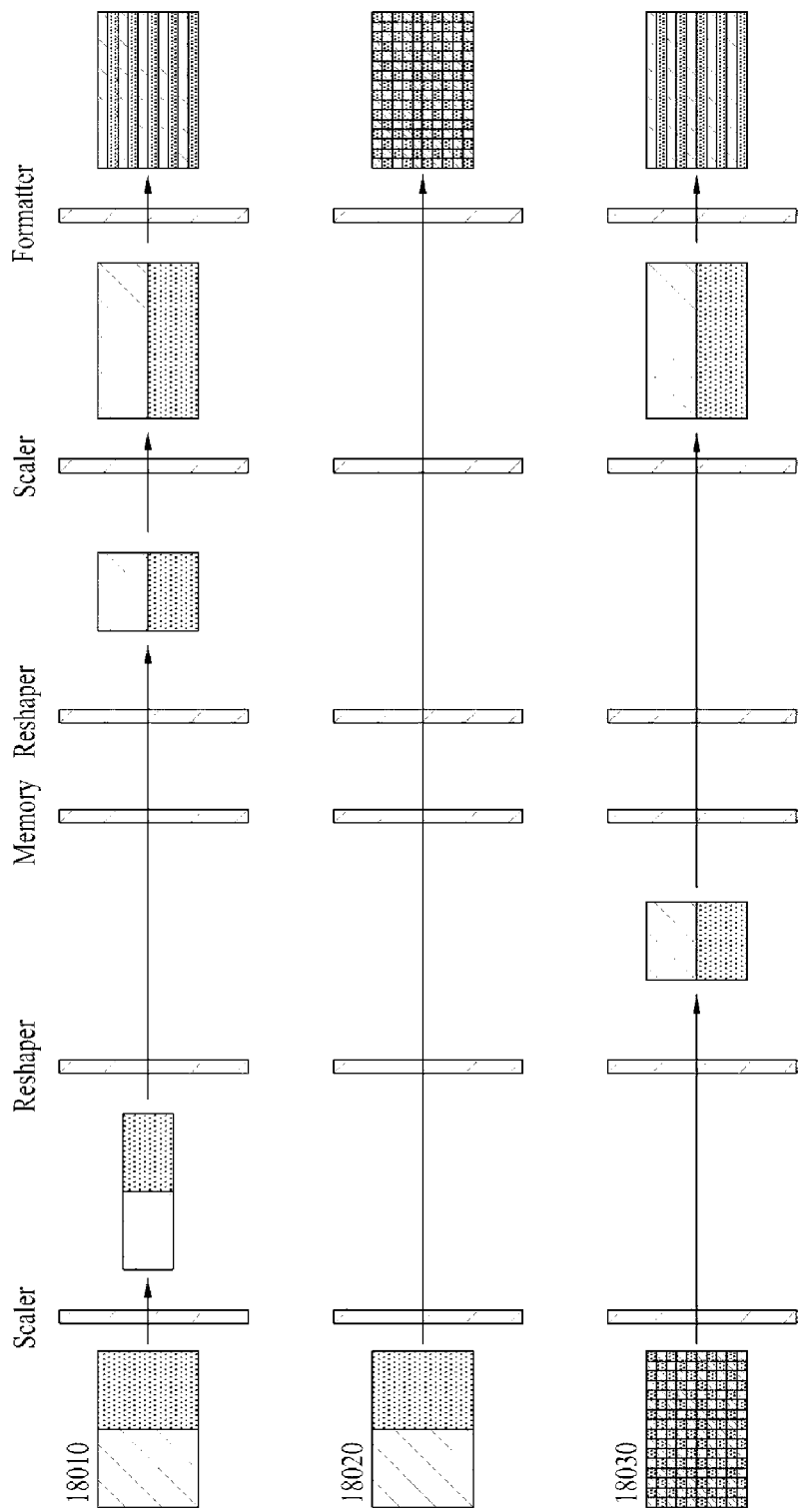
FIG. 18 shows a video data processing method for use in a broadcast receiver that converts a multiplexing format of a received image using 3D image format information and then outputs the converted result according to one embodiment of the present invention.

FIGS. 17 and 18 illustrate methods for converting a multiplexing format of a received image into another multiplexing format using 3D image format information.

FIG. 17 is a block diagram illustrating a broadcast receiver that converts a multiplexing format of a received image using 3D image format information and then outputs the converted result according to one embodiment of the present invention.

In FIG. 17, the same parts as those of FIG. 12 will herein be omitted for convenience of description and better understanding of the present invention.

In the embodiment shown in FIG. 12, a 2D image (i.e., a frame composed of oneviewpoint image) is displayed and thus the formatter displays the received image without any change. In contrast, in the embodiment shown in FIG. 17, the formatter processes the received 3D video data, and converts the processed video data into an image output format prescribed in the display device or the broadcast receiver.

FIG. 18 shows a video data processing method for use in a broadcast receiver that converts a multiplexing format of a received image using 3D image format information and then outputs the converted result according to one embodiment of the present invention.

First of all, the following embodiment relates to an exemplary case in which the multiplexing format of the received 3D image corresponds to the side-by-side format and the output format is the horizontally interlaced format. Individual fields of the 3D image format information are set to as follows: LR_first_flag=0, LR_output_flag=0, stereo_composition_type=1, Left_flipping_flag=0, Right_flipping_flag=0, and Sampling_flag=0.

The scaler performs vertical 1/2 resizing of the received side-by-side format image 18010, and outputs the resized result. The reshaper stores the output image in the memory, performs image scanning using the top-bottom format, and outputs the scanned result. The scaler performs horizontal 2/1 resizing of the received top-bottom format image, and the formatter converts the received full-screen top-bottom format image into the horizontally interlaced format and outputs the conversion result.

Next, the following embodiment relates to an exemplary case in which the multiplexing format of the received 3D image corresponds to the side-by-side format and the output format is the checkerboard format. Individual fields of 3D image format information are set to as follows: LR_first_flag=0, LR_output_flag=0, stereo_composition_type=1, Left_flipping_flag=0, Right_flipping_flag=0, and Sampling_flag=0.

In the case of the checkerboard format image, if the broadcast receiver receives the 1/2-resized image 18020 in the same manner as in the side-by-side format image or the top-bottom format image, the broadcast receiver has only to convert a format of the received image into another format. In other words, the broadcast receiver does not perform additional image processing of the received side-by-side format image 18020 using the scaler and the reshaper, and controls the formatter to convert only the multiplexing format and output the converted result. In another embodiment, the broadcast receiver reads a left image and a right image from the received side-by-side format image, and performs 2/1 resizing about each of the read left image and the read right image. The broadcast receiver may perform 1/2 down-sampling on each of the full-screen left image and the full-screen right image using the checkerboard format, and mix two images (i.e., the full-screen left image and the full-screen right image) with each other.

Finally, the following embodiment relates to an exemplary case in which the multiplexing format of the received 3D image corresponds to the checkerboard format and the output format is the horizontally interlaced format. Individual fields of 3D image format information are set to as follows: LR_first_flag=0, LR_output_flag=0, stereo_composition_type=4, Left_flipping_flag=0, Right_flipping_flag=0, and Sampling_flag=0.

In the case of receiving the checkerboard format image 18030, the reshaper scans the image, reshapes the scanned image as the horizontal 1/2-sized top-bottom format image, stores the reshaped resultant image and outputs it. The scaler performs horizontal 2/1 resizing of the 1/2-sized top-bottom format image, and thus outputs a full-screen top-bottom format image. The formatter converts the full-screen top-bottom format into another format, and thus outputs the horizontally interlaced format image.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR THE INVENTION

Various embodiments have been described in the best mode for carrying out the invention.

INDUSTRIAL APPLICABILITY

As apparent from the above description, embodiments of the present invention may be wholly or partially applied to a digital broadcasting system.

The broadcast receiver can process 3D video data such that a 3D effect intended by a 3D broadcast service provider is reflected in the 3D broadcast service. The broadcast receiver can effectively provide a 3D broadcast service simultaneously while minimizing the effect on a conventional 2D broadcast service.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A three dimensional (3D) video data processing method, the method comprising:
   formatting, by a video formatter, 3D video data;
   encoding, by an encoder, the formatted 3D video data;
   generating, by a system information processor, system information having 3D image format information that includes information about the 3D video data; and
   transmitting, by a transmitting unit, a broadcast signal including the 3D video data and the system information,
   wherein the 3D image format information includes information indicating whether a left image or a right image is formatted in a reverse direction.

2. The 3D video data processing method according to claim 1, wherein the 3D image format information is located in a Program Map Table (PMT) or Terrestrial Virtual Channel Table (TVCT) contained in the system information.

3. The 3D video data processing method according to claim 2, wherein the 3D image format information is used to perform formatting and decoding of the 3D video data, and includes 3D image multiplexing format information, and information about a sampling scheme used for formatting the 3D image.

4. A broadcast transmitter comprising:
   a video formatter for formatting 3D video data;
   an encoder for encoding the formatted 3D video data;
   a system information processor for generating system information having 3D image format information that includes information about the 3D video data; and
   a transmitting unit for transmitting a broadcast signal including the 3D video data and the system information,
   wherein the 3D image format information includes information indicating whether a left image or a right image is formatted in a reverse direction.

5. The broadcast transmitter according to claim 4, wherein the 3D image format information is located in a Program Map Table (PMT) or Terrestrial Virtual Channel Table (TVCT) contained in the system information.

6. The broadcast transmitter according to claim 5, wherein the 3D image format information is used to perform formatting and decoding of the 3D video data, and includes 3D image multiplexing format information, and information about a sampling scheme used for formatting the 3D image.

7. A three dimensional (3D) video data processing method, the method comprising:
   receiving, by a receiving unit, a broadcast signal including 3D video data and system information;
   obtaining, by a system information processor, 3D image format information that includes information about the 3D video data by parsing the system information;
   decoding, by a decoder, the 3D video data;
   scanning, by an output formatter, the decoded 3D video data according to the 3D image format information which includes information indicating whether a left image or a right image is formatted in a reverse direction, and formatting the scanned video data.

8. The 3D video data processing method according to claim 7, wherein the 3D image format information is located in a Program Map Table (PMT) or Terrestrial Virtual Channel Table (TVCT) contained in the system information.

9. The 3D video data processing method according to claim 8, wherein the formatting of the 3D video data includes:
   scanning, by a reshaper, at least one of the left image and the right image, and reshaping the scanned image;
   resizing, by a scaler, at least one of the left image and the right image; and formatting, by a formatter, the left image and the right image according to a multiplexing format for displaying the left image and the right image.

10. A broadcast receiver comprising:
a receiving unit for receiving a broadcast signal including 3D video data and system information;
a system information processor for obtaining 3D image format information that includes information about the 3D video data by parsing the system information;
a decoder for decoding the 3D video data;
an output formatter for scanning the decoded 3D video data according to the 3D image format information which includes information indicating whether a left image or a right image is formatted in a reverse direction, and formatting the scanned video data.

11. The broadcast receiver according to claim 10, wherein the 3D image format information is located in a Program Map Table (PMT) or Terrestrial Virtual Channel Table (TVCT) contained in the system information.

12. The broadcast receiver according to claim 11, wherein the output formatter includes:
a reshaper for reshaping at least one of the left image and the right image, and reshaping the scanned image;
a scaler for resizing at least one of the left image and the right image; and
a formatter for formatting the left image and the right image according to a multiplexing format for displaying the left image and the right image.

13. The 3D video data processing method according to claim 2, wherein the 3D image format information includes information indicating whether a specific image is a left image or a right image.

14. The 3D video data processing method according to claim 2, wherein the 3D image format information includes information indicating which at least one of the left image and right image is used for a 2 dimensional (2D) video service.

15. The broadcast transmitter according to claim 5, wherein the 3D image format information includes information indicating whether a specific image is a left image or a right image.

16. The broadcast transmitter according to claim 5, wherein the 3D image format information includes information indicating which at least one of the left image and right image is used for a 2 dimensional (2D) video service.

17. The 3D video data processing method according to claim 8, wherein the 3D image format information includes information indicating whether a specific image is a left image or a right image.

18. The 3D video data processing method according to claim 8, wherein the 3D image format information includes information indicating which at least one of the left image and right image is used for a 2 dimensional (2D) video service.

19. The broadcast receiver according to claim 11, wherein the 3D image format information includes information indicating whether a specific image is a left image or a right image.

20. The broadcast receiver according to claim 11, wherein the 3D image format information includes information indicating which at least one of the left image and right image is used for a 2 dimensional (2D) video service.

* * * * *